US011756058B2

(12) United States Patent
Sinha et al.

(10) Patent No.: US 11,756,058 B2
(45) Date of Patent: Sep. 12, 2023

(54) INTELLIGENT CUSTOMER JOURNEY MINING AND MAPPING

(71) Applicant: ADOBE INC., San Jose, CA (US)

(72) Inventors: Ritwik Sinha, Cupertino, CA (US); Fan Du, Milpitas, CA (US); Sunav Choudhary, West Bengal (IN); Sanket Mehta, Dist-Pune (IN); Harvineet Singh, Jersey City, NJ (US); Said Kobeissi, Lovettsville, VA (US); William Brandon George, Pleasant Grove, UT (US); Chris Challis, Alpine, UT (US); Prithvi Bhutani, Lynnwood, WA (US); John Bates, Pleasant Grove, UT (US); Ivan Andrus, Saratoga Springs, UT (US)

(73) Assignee: ADOBE INC., San Jose, CA (US)

( * ) Notice: Subject to any disclaimer, the term of this patent is extended or adjusted under 35 U.S.C. 154(b) by 252 days.

(21) Appl. No.: 17/091,569

(22) Filed: Nov. 6, 2020

(65) Prior Publication Data

US 2022/0148013 A1    May 12, 2022

(51) Int. Cl.
*G06Q 30/00*     (2023.01)
*G06Q 30/0201*   (2023.01)
*G06F 17/18*     (2006.01)
*G06F 16/904*    (2019.01)

(52) U.S. Cl.
CPC ....... *G06Q 30/0201* (2013.01); *G06F 16/904* (2019.01); *G06F 17/18* (2013.01)

(58) Field of Classification Search
None
See application file for complete search history.

(56) References Cited

U.S. PATENT DOCUMENTS

| | | | | |
|---|---|---|---|---|
| 10,296,928 B1* | 5/2019 | Leibon | | G06Q 30/0204 |
| 10,445,745 B1* | 10/2019 | Chopra | | G06F 16/3344 |
| 2014/0379428 A1* | 12/2014 | Phansalkar | | H04L 67/535 |
| | | | | 705/7.32 |
| 2017/0039233 A1* | 2/2017 | Gauthier | | G06F 3/0482 |
| 2017/0061338 A1* | 3/2017 | Mack | | G06Q 10/0637 |
| 2018/0268475 A1* | 9/2018 | Ziskin | | G06Q 30/08 |
| 2019/0340622 A1* | 11/2019 | Azoulay | | G06Q 30/0205 |
| 2020/0250747 A1* | 8/2020 | Padmanabhan | | G06Q 20/389 |

(Continued)

OTHER PUBLICATIONS

Lemon, Katherine N., and Peter C. Verhoef. "Understanding customer experience throughout the customer journey." Journal of marketing 80.6 (2016): 69-96. (Year: 2016).*

(Continued)

*Primary Examiner* — Gurkanwaljit Singh
(74) *Attorney, Agent, or Firm* — F. Chau & Associates, LLC

(57) ABSTRACT

Determination of high value customer journey sequences is performed by determining customer interactions that are most frequent as length N=1 sub-sequences, recursively determining most frequent length N+1 sub-sequences that start with the length N sub-sequences, determining a first count indicating how often one of the sub-sequences appears in the sequences, determining a second count indicating how often the one sub-sequence resulted in the goal, and using the counts to determine the most or least effective sub-sequences for achieving the goal.

19 Claims, 8 Drawing Sheets

(56) References Cited

U.S. PATENT DOCUMENTS

2020/0273052 A1* 8/2020 Ganti ................ G06Q 30/0204
2020/0293621 A1* 9/2020 Ayers ..................... G06F 40/56

OTHER PUBLICATIONS

Anderl, Eva, Jan Hendrik Schumann, and Werner Kunz. "Helping firms reduce complexity in multichannel online data: A new taxonomy-based approach for customer journeys." Journal of Retailing 92.2 (2016): 185-203. (Year: 2016).*

Kumar, Amresh, and Bhawna Anjaly. "How to measure post-purchase customer experience in online retailing? A scale development study." International Journal of Retail & Distribution Management 45.12 (2017): 1277-1297. (Year: 2017).*

Novak, Thomas P., Donna L. Hoffman, and Yiu-Fai Yung. "Measuring the customer experience in online environments: A structural modeling approach." Marketing science 19.1 (2000): 22-42. (Year: 2000).*

Krist Wongsuphasawat et al., "LifeFlow: Visualizing an Overview of Event Sequences", CHI '11: Proceedings of the SIGCHI Conference on Human Factors in Computing Systems May 2011, pp. 1747-1756.

Sinha R., Mehta S., Bohra T., Krishnan A. (Dec. 2015 "Improving Marketing Interactions by Mining Sequences", In: Wang J. et al. (eds) Web Information Systems Engineering—WISE 2015. WISE 2015. Lecture Notes in Computer Science, vol. 9418.

* cited by examiner

| Sess ID | Hit Id | Page Visited |
|---|---|---|
| S1 | 1 | O |
| S1 | 2 | W |
| S2 | 1 | A |
| S2 | 2 | D |
| S2 | 3 | C/O |
| S3 | 1 | B |
| S3 | 2 | M |
| S3 | 3 | A |
| S3 | 4 | O |
| S3 | 5 | D |
| S3 | 6 | W |

Session1 / Session2 / Session3

Customer interactions database 136

FIG. 6

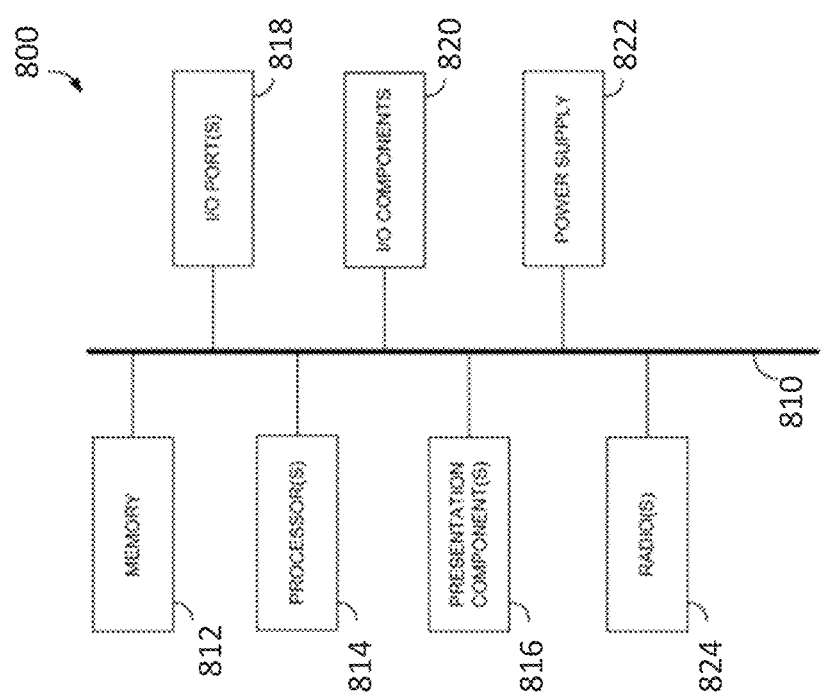

INTELLIGENT CUSTOMER JOURNEY MINING AND MAPPING

1. TECHNICAL FIELD

This disclosure relates to mining and mapping of customer journeys, and more particularly to application of sequence mining to customer journeys for determining effective sequences of customer interactions.

2. BACKGROUND

A customer experience is the product of an interaction between an organization and a customer over the duration of their relationship. The interaction includes a customer journey, brand touchpoints the customer interacts with, and the environments the customer interacts with during the experience. The customer journey refers to a process a potential customer goes through with a brand. The customer journey may include stages, such as browsing, building a cart, purchase, and post-purchase. Customer journey mapping analyzes a customer journey to produce a customer journey map that illustrates the story of the customer's experience. The customer journey map is a diagram that illustrates the sequence of steps customer(s) go through in engaging with a brand or a company.

Some customer journeys evolve into a continuing valuable relationship between a customer and a brand. However, most of these journeys fizzle out before creating a valuable relationship. The customer journeys that are most and least effective in resulting in a conversion are of great importance. However, measuring customer journeys and their effectiveness is difficult, due to the large number of distinct types of interactions between a brand and customer and lengths of these interactions. Therefore, a need exists for a customer relationship management strategy that efficiently identify high value customer journey sequences.

SUMMARY

Systems, methods, and software are described herein for analyzing customer journey sequences to determine the sequences that are most or least effective in satisfying a particular marketing goal.

In an exemplary embodiment of the disclosure, pathing analytics identifies high value customer journey sequences from interaction data. The interaction data includes interactions between potential or existing customers and a brand or company. Based on a particular goal, the pathing analytics converts the interaction data into sequences that indicate whether the goal was achieved. The pathing analytics applies a recursive function to the sequences to determine sub-sequences within the sequences that are most or least likely to achieve the goal.

In an exemplary embodiment of the disclosure, a system for determining high value customer journey sequences includes a client device and a server. The client device enables a user to trigger an analysis by the server on customer journey sequences. The analysis analyzes each sequence to determine an element that occurs frequently, determines sub-sequences within the sequences beginning with the element and occurring frequently, and determines counts for each sub-sequence indicating how often the sub-sequence occurred and how often the sub-sequence resulted in a conversion. The server then determines one or more of the sub-sequences that is most or least likely to result in the conversion based on the counts, and outputs these to the client device.

In an exemplary embodiment of the disclosure, pathing analytics determines a high value customer journey sequence from many sequences of webpages visited by a user. The pathing analytics uses the most frequently visited webpage within the sequence as a starting page, determines the sub-sequences that begin with the starting page, and generates counts for each the sub-sequences indicating how often they appear in the sequences and whether they resulted in a certain goal. The pathing analytics determines at least one high value customer journey sequence from the counts and the sub-sequences.

In a further embodiment of the disclosure, a graphical user interface presents several of the determined sub-sequences to enable a user to compare customer journey sequences that are likely or unlikely to achieve a particular marketing goal. The graphical user interface provides a visualization for each sequence that includes visual information indicating likely a given sequence is to achieve the goal and how much each element of the sequence contributes to achieving the goal.

BRIEF DESCRIPTION OF THE DRAWINGS

The detailed description describes one or more embodiments with additionally specificity and detail through use of the accompanying drawings, briefly described below.

FIG. 6 illustrates an example of interaction data for unique sessions.

FIG. 8 illustrates an exemplary computing device used to perform one or more methods of the disclosure.

DETAILED DESCRIPTION OF THE EXEMPLARY EMBODIMENTS

Figure 1:
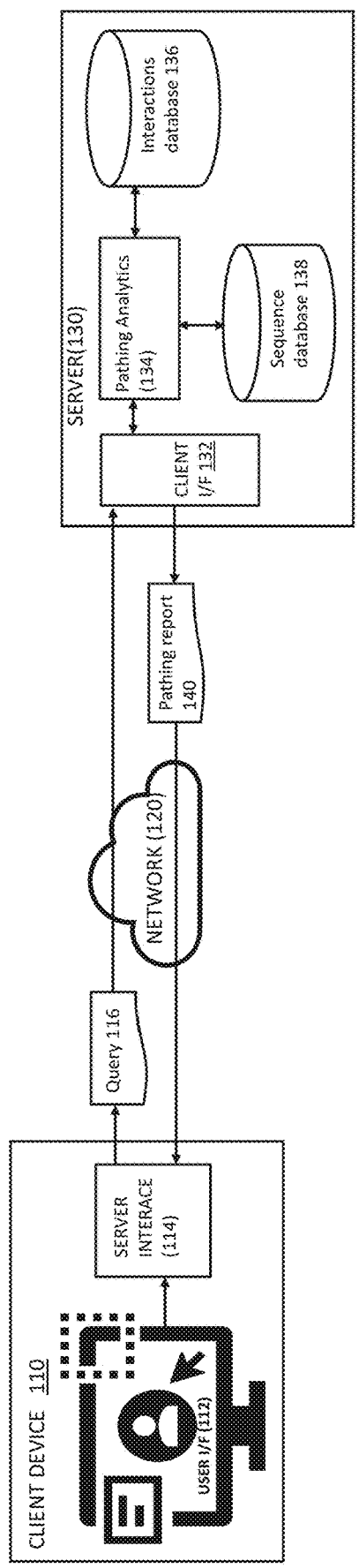
FIG. 1 is an illustration of an environment in an example implementation that is operable to employ techniques described herein.

Web analytic tools that monitor customer journeys exist. For example, Google Analytics® includes a pathing function that provides a pathing report from an analysis of customer interactions with a brand. The pathing function searches for the most common sequences among consecutive interactions, and transitions from the most common sequences. However, the tool is only capable of analyzing exact sequences and does not consider any goal on which to perform the search. Thus, the pathing function provides the most common path without any information on how likely that path is to lead to a conversion.

Further, since an analytical software tool operates on interaction data that is usually stored in a relational database and there are many different types of interactions between a potential customer and a brand, it takes days for the tool to analyze the data to determine the most effective customer journeys (e.g., interaction sequences most likely to result in a continuing relationship with the brand). Moreover, since the tool only analyzes exact sequences, it may erroneously conclude that a certain sequence is not an effective journey even though part of the sequence is in fact an effective journey or path. Further, since the tool does not consider a goal (e.g., a sale, an order, churn, etc.) in its analysis, it may erroneously conclude that a very frequent sequence is most effective even though a less frequent sequence achieves the goal more often.

Accordingly, embodiments of the disclosure provide a system and method that efficiently identify high value customer journey sequences. According to at least one embodiment, an analytical tool (e.g., pathing analytics) operates on customer interaction data stored in a columnar database so that sequences are mined efficiently, with results ready in minutes and not days. In some embodiments, an analytical tool considers partial sequences of interactions (e.g., a sub-sequences) with a brand or company in addition to entire sequences, along with a goal (e.g., a positive or negative outcome) to drill down to the most or least effective customer interaction sequences. In yet another embodiment of the disclosure, the resulting customer interaction sequences are presented on a graphical user interface. The graphical user interface enables a user to visualize how well each interaction of a given sequence contributes overall to reaching the goal, and to compare and contrast several interaction sequences.

The following terms are used throughout the present disclosure:

The term "sequence" refers to an enumerated collection of objects (e.g., interactions) in a particular order, where repetition of one or more of the objects is allowed.

The term "sub-sequence" refers to a sequence that can be derived from another sequence by deleting some elements without changing the order of the remaining elements.

The term "session" refers to a group of user interactions with a website during a given time frame. For example, a given session may include multiple webpage views, social interactions, and economic transactions.

The term "columnar database" refers to a database management system (DBMS) that stores data in columns instead of rows. A columnar database may also be referred to as a column-oriented DBMS.

The term "churn" refers to a failure to result in a rewarding relationship with a company or a loss of the relationship. A churn may occur when a user interacts with a website of the company and leaves without making a purchase or when an existing customer stops doing business with the company (e.g., canceled subscription or membership).

The term "pathing analytics" refers to a computer program or a computer system that analyzes interaction data to determine high value customer journey sequences.

Figure 3:
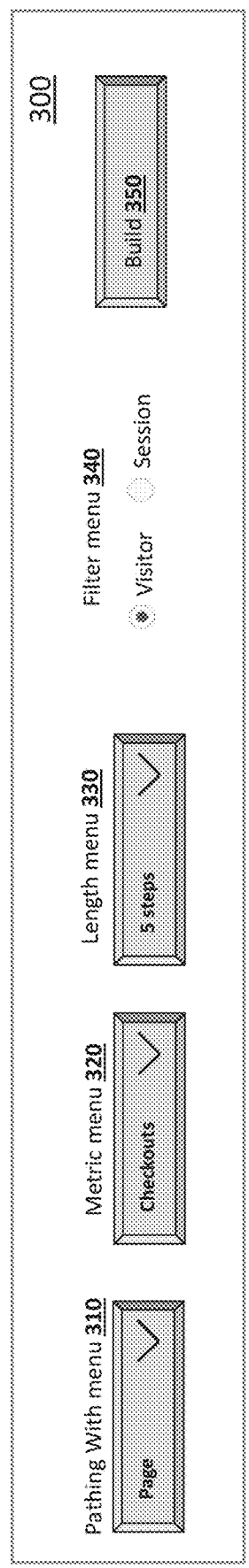
FIG. 3 illustrates an example of a screen used to enter a query to trigger performance of the method.

Exemplary embodiments of the inventive concept are applicable to a client-server environment and a client-only environment. FIG. 1 shows an example of the client-server environment, where a user uses a query screen of a graphical user interface 112 of a client device 110 to create a pathing query 116. The query screen will be discussed in more detail below with respect to FIG. 3.

The pathing query 116 indicates a dimension on which to define a path (e.g., a webpage) and a metric to determine a goal. Application of the pathing query 116 results in a pathing report 140 including at least one sequence of interactions. In an embodiment where the dimension is a webpage and the goal is conversion, the metric is reaching a checkout webpage or a shopping cart webpage that enables a user to make a purchase. For example, the sequence of interactions could be all of the webpages visited by a first user including the checkout page, during a first session. In an embodiment where the dimension is webpage and the goal is churn, the metric is reaching a cancelation webpage that enables a user to cancel a purchase. For example, the sequence of interactions could be all of the webpages visited by a second user including the cancellation page, during a second session. A dimension of webpage and a metric of reaching a checkout webpage are related to one another since the metric is a type of the dimension. However, the metric and the dimension do not have to be related to one another. For example, the metric could be placing an order, adding a product to an electronic cart, registering with a website, a certain amount of revenue, etc. While webpages could be analyzed to determine whether these metrics have occurred, they are not entirely dependent on the dimension being a webpage. For example, if the dimension were zip code, the metric were placing an order, and the interactions were started browsing for a television (TV) from home at zip code 95014, looked at reviews for the TV from work at zip code 95110, and completed the purchase in a café at zip code 95121, the sequence would be 95014→95110→95121. Other examples of the dimension include type of browser used, visit number, product, and day.

A server interface 114 of the client device 110 sends the pathing query 116 across a computer network 120 and a client interface 132 of a server 130 receives the pathing query 116 from the computer network 120. Pathing analytics 134 (e.g., a software tool) of the server 130 extracts interaction data from an interactions database 136 according to the pathing query 116. In an exemplary embodiment, the interactions database 136 is a columnar database, the interaction data is stored in tables of the columnar database, and one or more queries suitable for the columnar database are performed to extract the interaction data. In an embodiment where the dimension is a webpage, the interaction data indicates visits to webpages and a time or order when the visits occurred. The interaction data will be discussed in more detail below.

The pathing analytics 134 performs a pathing operation on the extracted interaction data according to the pathing query 116 to determine relevant sub-sequences for storage in a sequence database 138. In an embodiment where the dimension is a webpage, each sub-sequence indicates an order of webpages visited by a prospective customer during a given period and whether the sub-sequence reached the goal of the pathing query 116. In an embodiment, the sub-sequences include sub-sequences that frequently reached the goal and sub-sequences that frequently failed to reach the goal. The pathing operation will be discussed in more detail below.

The pathing analytics 134 generates a pathing report 140 from the sub-sequences and the client interface 132 sends the pathing report 140 across the computer network 120 to the client device 110. A server interface 114 of the client device 114 receives the pathing report 140 and the graphical user interface 112 presents an interactive pathing visualization based on the pathing report 114.

In an exemplary embodiment, the pathing report 140 includes at least one of the sub-sequences that frequently reached the goal, or at least one of the sub-sequences that frequently failed to reach the goal, and information to illustrate each of the sub-sequences. The information may include text representing a title or name of each item (e.g., a webpage) of the sub-sequence or text representing an action associated with each item. The information may further include a count of the number of visits to each item of the sub-sequence, and a count of the number of times each sub-sequence reached the goal or failed to achieve the goal. The interactive pathing visualization is generated from the information. In an embodiment, the interactive pathing visualization contrasts converting and non-converting paths. The interactive pathing visualization will be discussed in more detail below with respect to FIG. 7.

According to an embodiment of the inventive concept in a client-only environment, the client device 110 creates the interaction data, the sub-sequences, and the pathing report 114 itself without relying on the remote server 130. In this embodiment, the pathing analytics 132 is located on the client device 110, and the databases 136 and 138 are located on the client device 110 or are accessible to the client device 110 across the computer network 120.

The computer network 120 may be wired, wireless, or both. The computer network 120 may include multiple networks, or a network of networks, but is shown in a simple form so as not to obscure aspects of the present disclosure. By way of example, the computer network 120 includes one or more wide area networks (WANs), one or more local area networks (LANs), one or more public networks, such as the Internet, and/or one or more private networks. Where the computer network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the computer network 120 is not described in significant detail.

The client device 110 is a computing device capable of accessing the Internet, such as the World Wide Web. The client device 110 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

The client device 110 includes one or more processors, and one or more computer-readable media. The computer-readable media may include computer-readable instructions executable by the one or more processors. The instructions may correspond to one or more applications, such as software to enable the user draw graphics including complex shapes and text, to merge a complex shape with the text to generate a text-on-path graphic, and to interface with the server 130 for transmitting information including a complex shape and text and receiving a text-on-path graphic.

The server 130 includes a plurality of computing devices configured in a networked environment or includes a single computing device. Each server computing device includes one or more processors, and one or more computer-readable media. The computer-readable media may include computer-readable instructions executable by the one or more processors. The instructions may correspond to one or more applications, such as software to interface with the client device 110 for receiving the pathing query 116 and sending the pathing report 140 and performing the pathing operation.

Figure 2:
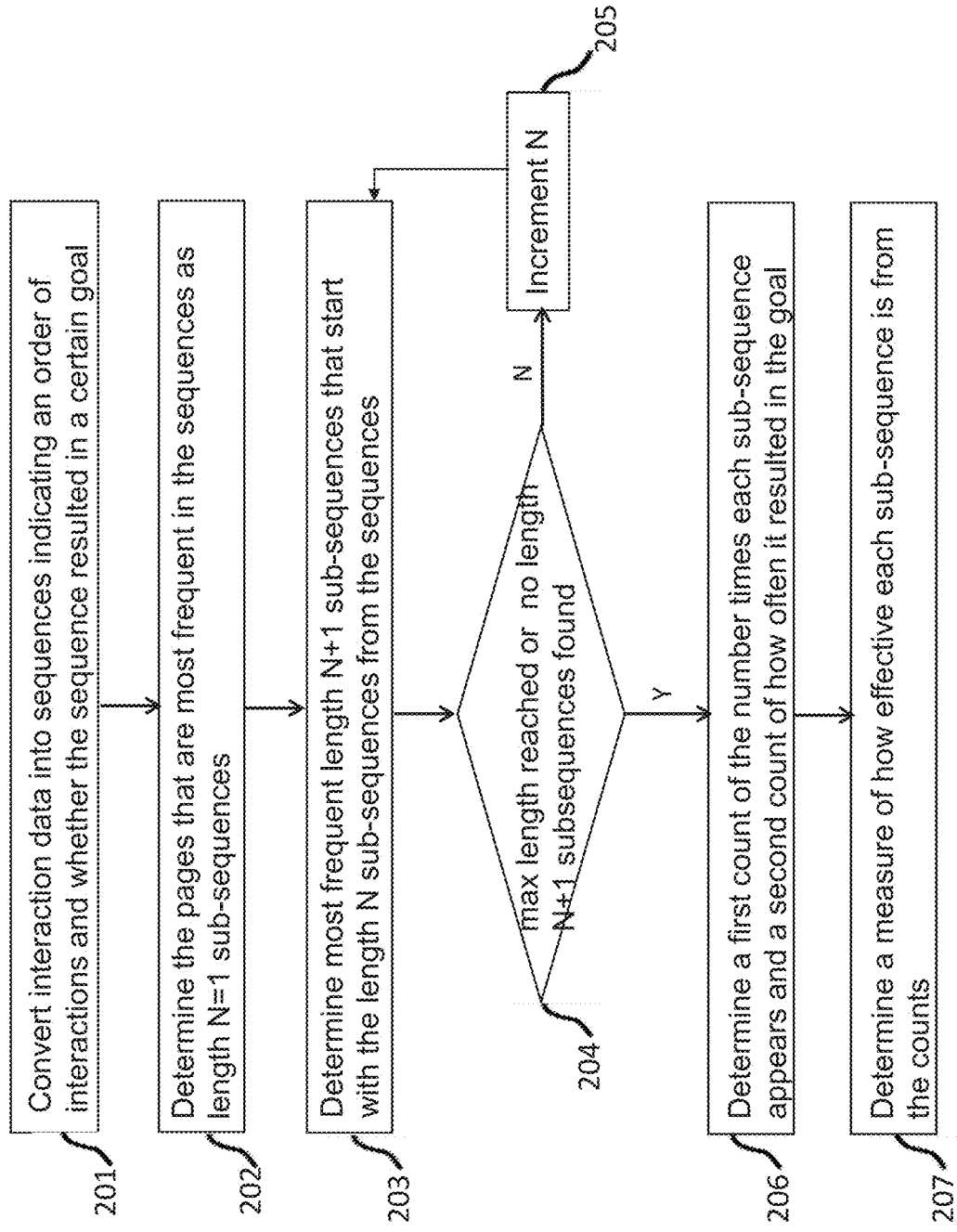
FIG. 2 illustrates a method of determining effective sub-sequences from interaction data according to an exemplary embodiment of disclosure.

FIG. 2 illustrates a method of determining sub-sequences from a query of a user according to an exemplary embodiment of disclosure. In an exemplary embodiment, a path query 140 is entered using a query screen 300 of the graphical user interface 112 illustrated in FIG. 3. In an exemplary embodiment, the pathing query 140 is entered by at least selecting a dimension from a Pathing With menu 310, selecting a metric from a Metric menu 320, and the Pathing Analytics 134 performs a pathing operation on the entered pathing query 140 to determine relevant sub-sequences when a user selects an activation button. For example, the method of FIG. 2 is executed when the user selects the Build button 350 of FIG. 3.

In an exemplary embodiment, the length of the sub-sequences is limited to a certain maximum length to ensure that the pathing operation completes completely quickly. The maximum length has a default value or is adjusted by the user using a Length menu 330 of the query screen 300.

In an embodiment, the interaction data is filtered based on unique visitors or unique sessions. The filtering defaults to a certain type of filtering or is adjusted by the user using a Filter menu 350 of the query screen 300. In an exemplary embodiment, the interaction data is extracted from an ADOBE AXLE® database, which is an ordered, hierarchical, distributed, and columnar database for interactive reporting on customer interaction data. In an exemplary embodiment, the interaction data includes a table where each row includes a visitor or session identifier (ID), a table where each row includes a timestamp of when an interaction occurred, and a table where each row includes information about the interaction that can be used to infer whether the metric occurred. In an exemplary embodiment, the interaction data is hashed by the ID so that all data for a given visitor or session is stored entirely on one worker machine in timestamp order.

When the dimension is a webpage and the filter type is session, the interaction data indicates the webpages visited by each unique session. For example, if a first visitor visited a first set of webpages during a first session and exited the first session; and then visited a second set of webpages during a second session, the interaction data would include a first entry indicating that the first set was visited during a first session and a second entry indicating that the second set was visited during a second session. When the dimension is a webpage and the filter type is visitor, the interaction data indicates the webpages visited by each unique visitor. For example, if the first visitor visited a first set of webpages during a first session and exited the first session; and then visited a second set of webpages during a second session, the interaction data would include a single entry indicating the first visitor visited the first and second set of webpages.

The method of FIG. 2 includes converting (e.g., by the pathing analytics 134) the interaction data into sequences indicating an order of interactions and whether the sequence resulted in a certain goal (step 201). In an exemplary embodiment, the order of interactions indicates an order of webpages visited by a certain user when the dimension is webpage. For example, if the user visits webpage W1 at time 1, visits webpage W2 at time 2, and visits webpage W3 at time 3, then the order of interactions would be W1→W2→W3. Please note that while the below discussions and examples assume a single dimension of webpage for convenience of explanation, in alternate embodiments, the pathing query 116 includes multiple types of dimension. For example, if one of the dimensions is webpage visited and another of the dimensions is advertisements watched (e.g., a movie advertising a particular product or brand), if the user visits webpage W1 at time 1, watches advertisement A at time 2, and visits webpage W2 at time 3, then the order of interactions would be W1→A→W2.

Figure 4:
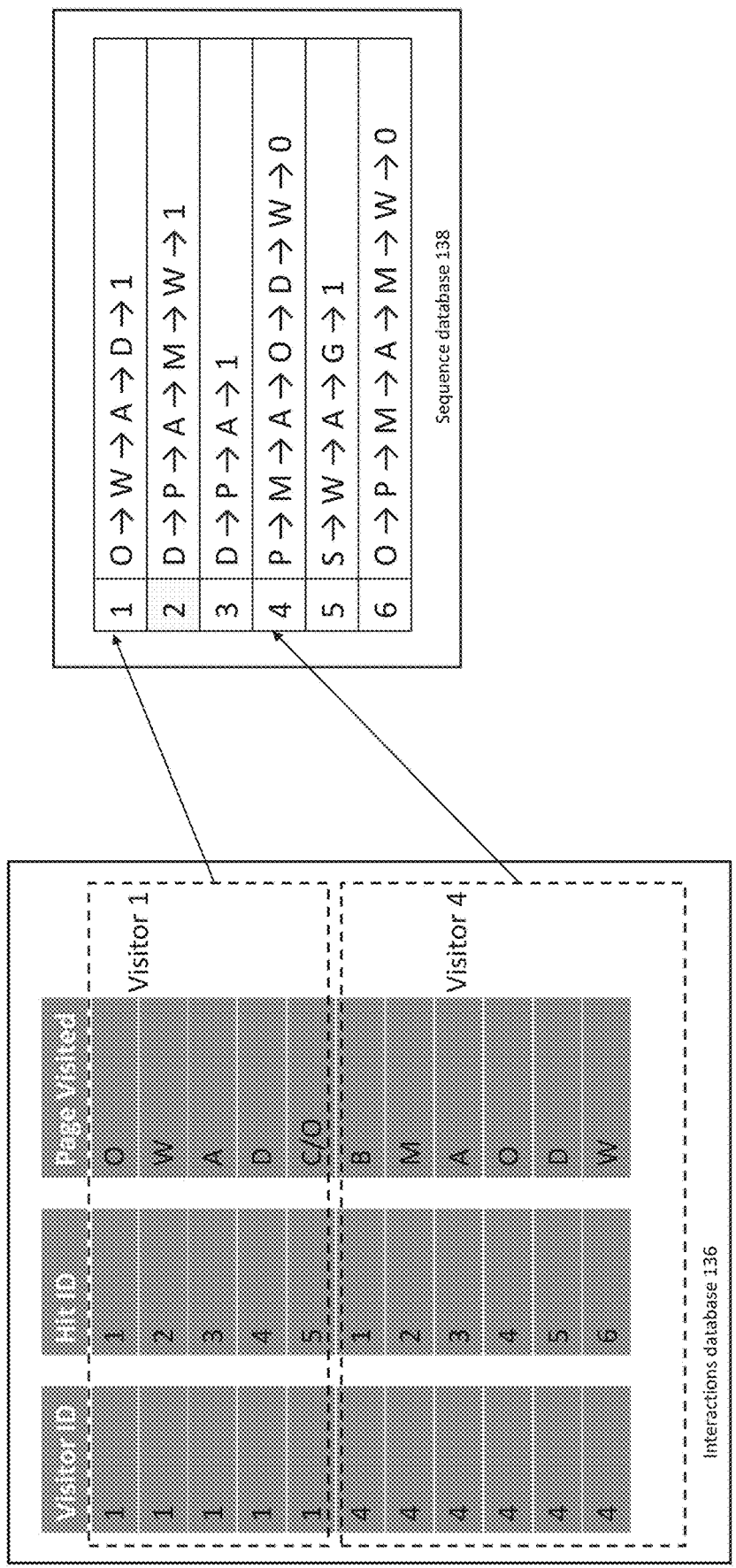
FIG. 4 illustrates an example of the interaction data of unique visitors being converted to sequences for use by the method.

FIG. 4 illustrates an example of some of the interaction data filtered according to unique visitor being converted into sequences. In FIG. 4, a first table ("Visitor ID") of the interactions database 136 indicates unique identifiers (IDs) of users recorded performing a certain action (e.g., a visiting a webpage), a second table ("Hit ID") of the interactions database 136 indicates an order that these actions were performed, and a third table (e.g., "Page Visited") of the interactions database 136 identifies the specific actions performed (e.g., names of the webpages visited). The first dotted box in the left side of FIG. 4 illustrates the webpages visited by Visitor 1 and the second dotted box in the left side of FIG. 4 illustrates the webpages visited by Visitor 4. The right side of FIG. 4 shows the interaction data of these two visitors being converted into sequences indicating whether the queried goal was reached. For example, the sub-sequence of 0→W→A→D of the first sequence indicates Visitor 1 visited a sequence of webpages O, W, A, D and the ending 1 of the first sequence indicates that the check/out (C/O) goal was reached. For example, the sub-sequence of P→M→A→O→D→W of the fourth sequence indicates Visitor 4 visited a sequence of webpages P, M, A, O, W and the ending 0 of the fourth sequence indicates that the check/out (C/O) goal was not reached.

The method of FIG. 2 further includes determining (e.g., by the pathing analytics 134) the pages that are most frequent in the sequences as length N=1 sub-sequences (step 202). A length N=1 or length 1 sub-sequence has only a single element. As shown in FIG. 4, page A occurs most frequently since it appears in all of the sequences. In an exemplary embodiment, this step is performed with respect to a branching factor. If the branching factor were 3, then the 3 most frequent pages would be determined. As shown in FIG. 4, when a branching factor of 3 is used, pages A, W, and P are determined since page A occurs most frequently, page W occurs second most frequently, and page P occurs third most frequently. In an exemplary embodiment, the branching factor is adjustable by a user using the query screen 300. Page A is a length 1 sub-sequence of the first through sixth sequences of FIG. 4, Page W is a length 1 sub-sequence of the first, second, and fourth through sixth sequences, and Page P is a length 1 sub-sequence of the second through fourth and sixth sequences.

The method of FIG. 2 further includes determining (e.g., by the pathing analytics 134) the most frequent length N+1 sub-sequences that start with the length N sub-sequences from the sequences (step 203). In an embodiment, this step also considers the branching factor. When this is the first time step 203 is executed, N=1, and N+1=2. Thus, the most frequent length 2 sub-sequences that start with the previously determined length 1 sub-sequences are determined. The length N+1 sub-sequences need not be immediately adjacent the length N sub-sequences. In FIG. 4, length 2 sub-sequence A→W starts with the previously determined length 1 sub-sequence A and occurs most frequently at three times.

The method of FIG. 2 further includes determining (e.g., by the pathing analytics 134) whether the maximum length has been reached or no length N+1 sub-sequences are found (step 204). As discussed above, the maximum length either has a default value (e.g., 5) or is dynamically set using the length menu 330 of the query screen 300. The maximum length has been reached when (N+1)=the maximum length. For example, when the maximum length is 5, and step 203 has only been executed once, then N+1=2, and the maximum length has not been reached. Further, when step 203 has only been executed once with respect to the data of FIG. 4, since a length 2 sub-sequence of A-W has been found, the method advances to step 205 of the method of FIG. 2, to increment N. Thus, the most frequent length 2+1 or 3 sub-sequences that start with the length 2 sub-sequences are determined. However, in FIG. 4, since A→W ends in either a 0 or 1, no length 3 sub-sequence is found, and thus the method advances to step 206 of the method of FIG. 2

Step 206 of FIG. 2 includes determining (e.g., by the pathing analytics 134) a first count of the number of times each sub-sequence appears and a second count of how often it resulted in the goal. For example, referring to the data of FIG. 4, since the sub-sequence A→W appeared 3 times, the first count is 3. Further, since A→W resulted in the goal only 1 time, the second count is 1.

The method of FIG. 2 further includes determining a measure or probability of how effective each sub-sequence is from the counts. In an exemplary embodiment, the probability is determined from dividing the second count by the first count. For example, the probability of a user following the sequence A→W and it resulting in the goal is ⅓ or 0.33. In an exemplary embodiment, a graphical user interface 112 of the client device 110 is configured to present sub-sequences with the probability above an upper threshold as customer journey sequences that most effectively achieve the goal.

In an exemplary embodiment of the disclosure, steps S201-S206 of FIG. 2 is performed by calling a recursive function to perform a depth first search for the best paths. In an embodiment, the inputs to the recursive function include an antecedent, the dimension(s) and the metric. In an exemplary embodiment, the inputs further include the maximum length and a filtering parameter such as filter by unique visitors or sessions. When the maximum length and a filtering parameter are not input, the recursive function can use default values. In an exemplary embodiment, the outputs of the recursive function includes, for each sub-sequence $A_1 \rightarrow A_2 \rightarrow \ldots \rightarrow A_K \rightarrow A_{K+1}$, a count of distinct sequences or paths that follow this sub-sequence, including the possibility that $A_i \rightarrow A_{i+1}$ are not adjacent. For example, as shown in FIG. 4, three distinct sequences include sub-sequence A→W even though M is located between A and W in the second and sixth sequence, and O and D are located between A and W in the fourth sequence. In an embodiment, the outputs further include an antecedent, which is a sequence that includes a set of interactions $A_1 \rightarrow A_2 \rightarrow \ldots \rightarrow A_K$, potentially with interactions in between. In an embodiment, the outputs further include, for each sub-sequence, a number of times the corresponding sub-sequence resulted in the goal being reached. For example, when the goal is a conversion or sale, the outputs include the number of conversions that follow sub-sequence $A_1 \rightarrow A_2 \rightarrow \ldots \rightarrow A_K \rightarrow A_{K+1}$.

Recursively calling this function with antecedent NULL, when the dimension is webpage, generates the webpages with the highest number of paths pathing through. For the first page in the list returned, the page is used as the antecedent, and the columnar database is queried with the function to output best paths of length 2, which start with the first page. Using the best length 2 path as the antecedent, columnar database is queried with the function to output best paths of length 3, etc. During this process, a path is only used as the antecedent in the next call if it meets a threshold minimum number of paths and it satisfies a branching factor. For example, if the branching factor were 2 with respect to the data of FIG. 4, only length 1 sub-sequences of A and W would be analyzed. When the metric is conversion, the results of the depth first search provides a sorted list of the best paths with counts and conversion counts.

In an exemplary embodiment, the pathing analytics 134 generates a pathing report 140 including information that lists the sub-sequences having a measure above an upper threshold and/or the sub-sequences having a measure below a lower threshold. The sub-sequences having a measure above the upper threshold are considered the sub-sequences most effective at achieving the goal and the sub-sequences below the lower threshold are considered the sub-sequences least effective at achieving the goal. The client device 110 is configured to present the information on a visualization screen of the graphical user interface 112. The visualization screen will be discussed in more detail below with respect to FIG. 7.

Figure 5:
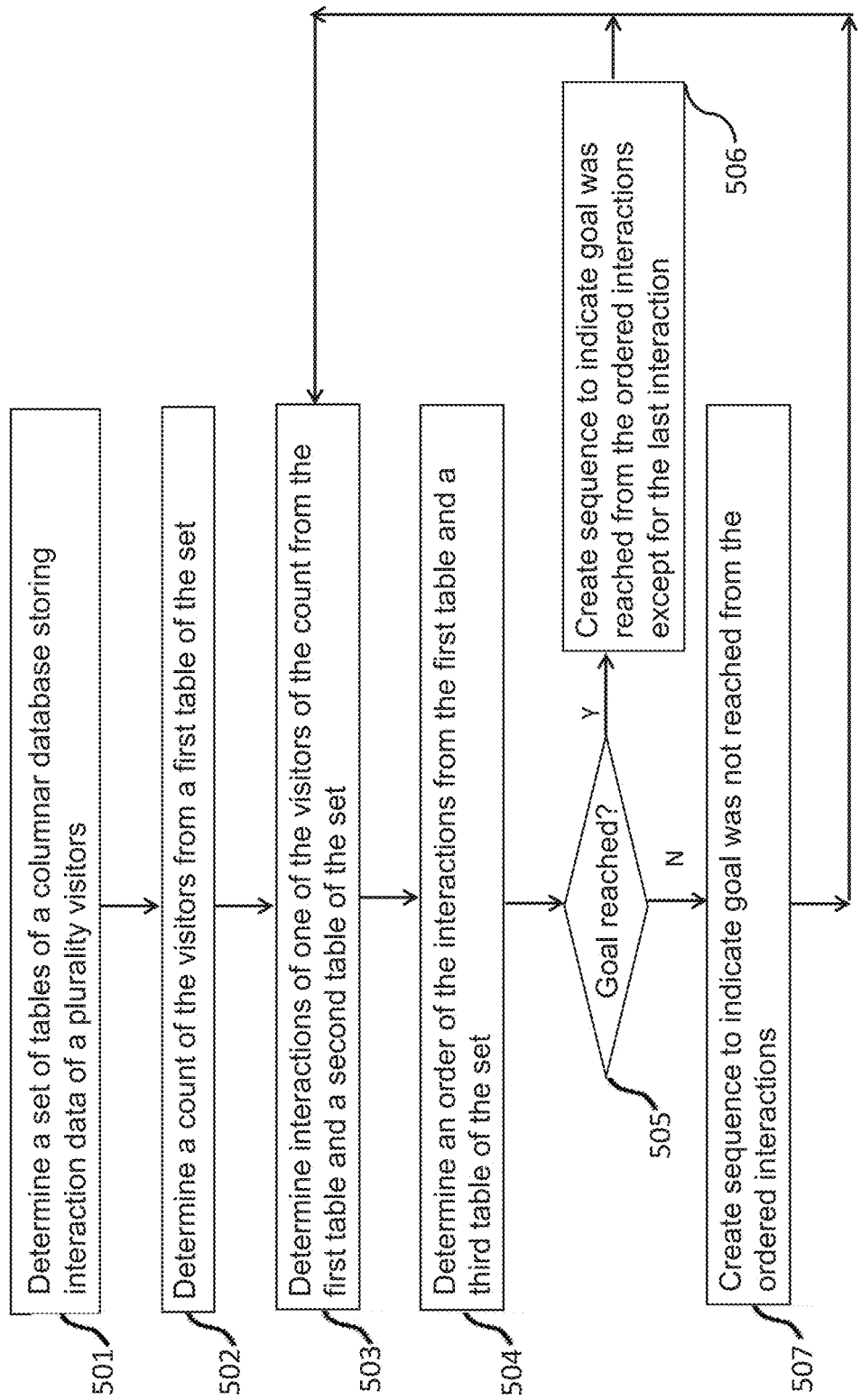
FIG. 5 illustrates a method of converting interaction data to sequences according to an exemplary embodiment of the disclosure.

FIG. 5 illustrates a method of determining the sequences according to an exemplary embodiment of the disclosure. In an exemplary embodiment, step 201 is performed using the method of FIG. 5.

The method of FIG. 5 includes determining a set of tables of a columnar database storing interaction data of a plurality of visitors (step 501). In an embodiment, the interactions database 136 is the columnar database. In FIG. 4, the set of tables referencing the visitors include a first table (e.g., a "Visitor ID" table) storing visitor IDs for uniquely identifying each of the visitors, a second table (e.g., a "Page Visited" table) storing IDs or names uniquely identifying each of the webpages visited by a corresponding one of the visitors, and a third table (e.g., a "Hit ID" table) storing order IDs or numbers for identifying an order in which each of the webpages were visited. Since the pathing query 116 specified visitors, the set of tables corresponds to the set of tables shown in FIG. 4. Had the pathing query 116 instead specified session, step 501 would have been replaced with a step of determining a set of tables of a columnar database storing interaction data of a plurality of sessions, and the set of tables would corresponds to the set of tables shown in FIG. 6.

The method of FIG. 5 further includes determining a count of the visitors from the first table (step 501). In the Visitor ID table of FIG. 4, since there are only two unique visitors, the count would be 2.

The method of FIG. 5 further includes determining interactions of the visitors (e.g., pages visited by the visitors) of the count from the first table and the second table (step 503). Using the data of FIG. 4 and a dimension of webpage, this step accesses the Visitor ID table and the Page Visited table to determine that the first visitor visited pages W, O, D, C/O, and A.

The method of FIG. 5 further includes determining an order of the interactions (e.g., the webpages) from the first table and a third table of the set (step 504). Using the data of FIG. 4 referencing the first visitor with Visitor ID=1, this step accesses the Visitor ID table and the Hit ID table to determine that the interactions (e.g., webpages were visited in order O→W→A→D→C/O).

The method of FIG. 5 further includes determining whether the goal was reached (step 505). In an embodiment, determining whether the goal was reached is determined by analyzing the interactions (e.g., webpages visited) or the last interaction (e.g., last webpage visited). For example, since the last webpage visited is a check out page C/O, and the metric selected from metric menu 320 is checkouts, it can be concluded that the goal has been reached.

The method of FIG. 5 further includes creating a sequence to indicate goal was reached from the ordered interactions (e.g., webpages) except for the last interaction (e.g., last webpage) (step 506). In the right of FIG. 4, the first sequence is created from the determined ordered webpages of the first visitor with Visitor ID=1 of O, W, A, and D, except for the last checkout webpage, and given an ending 1 to indicate the goal has been reached due to the last webpage being the checkout webpage.

The method of FIG. 5 next resumes back to step 503 to operate on the next visitor. In the data of FIG. 4, the next visitor would be the fourth visitor having Visitor ID=4. Since the last visited webpage of the fourth visitor is not the checkout webpage, the goal was not reached for the fourth visitor. When the goal is not reached, the method of FIG. 5 includes creating a sequence to indicate goal was not reached from the ordered interactions (e.g., webpages) (step 507). In the right of FIG. 4, the fourth sequence is created from all of the ordered webpages of P, M, A, O, D, and W of the fourth visitor with Visitor ID=4, and given an ending 0 to indicate the goal was not reached.

Figure 7:
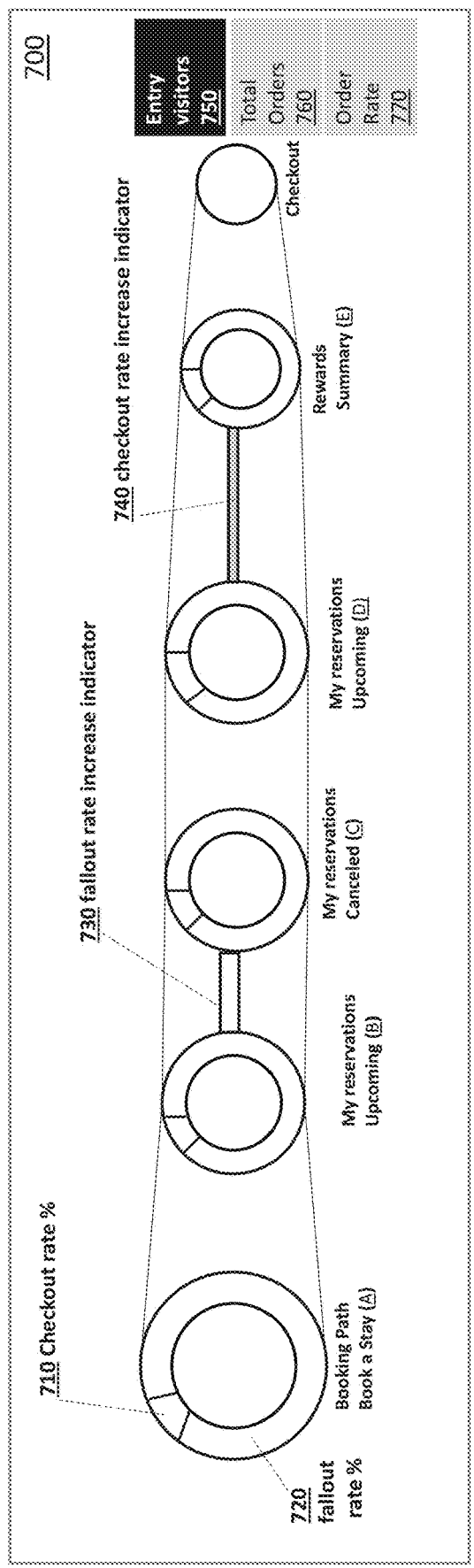
FIG. 7 illustrates an example of a screen for presenting effective sequences.

FIG. 7 illustrates an exemplary visualization screen 700 of the graphical user interface 112. In an embodiment, the visualization screen 700 provides the interactive pathing visualization. FIG. 7 illustrates one of the sequences that includes a sub-sequence that may be returned by the pathing operation and included within the pathing report 140. While the visualization screen 700 shows a single sequence for ease of discussion, the visualization screen 700 may include multiple sequences so that several customer journeys can be compared and contrasted by a user together. In FIG. 7, each item of the sequence is represented by a circle, where the radius of the circle is proportional to the number of visits to that item. Since each of the items in the sequence of FIG. 7 is a webpage visited, the radius of each circle is proportional to the number of visits to each webpage visited. Each circle includes a first arc representing a metric rate 710 and a second arc representing a fallout rate 720. The fallout rate 720 is equal to 100% minus the metric rate 710. When the metric is a checkout, the metric rate is a checkout rate, and the radius of the last circle is proportional to the number of the checkouts that occurred due to following the sequence.

The checkout rate of a given circle is calculated by dividing the number of checkouts that occurred following the sequence by the number of visits associated with the circle. The length of the first arc is proportional to the metric rate 710 and the length of the second arc is proportional to the fallout rate 720. For example, if there were 100,000 visits to the webpage represented by the first circle, and following the sequence resulted in 10,000 checkouts, then the checkout rate of the first circle would be 10% and the fallout rate would be 90%.

The visualization screen 700 further includes a fallout rate increase indicator 730 and a checkout rate increase indicator 740. The fallout rate increase indicator 730 indicates an amount or percent that the fallout rate increased in going from one item of the sequence to a next item of the sequence. For example, if it is assumed that 7.22% of the visitors who went through the sequence of A→B (see first two circles of FIG. 7) did not eventually place an order, and assumed that 18.41% of the visitors who went through sequence A→B→C (see first three circles of FIG. 7) did not eventually place an order, the fallout increase indicator 730 would indicate a fallout rate increase of 18.41%-7.22%=11.19%. The fallout rate increasing with respect to a sequence of three actions indicates that the last action of the three actions is a less rewarding action or a bad action. For example, if the sequence A→B→X had only a 5% fallout rate increase, a business may consider replacing the webpage associated with C with the webpage associated with X. The checkout rate increase indicator 740 indicates an amount of percent that that the checkout rate increased in going from one item of the sequence to a next item of the sequence. For example, if it is assumed that 89.27% of visitors who went through sequence C→D (see third and fourth circles of FIG. 7) eventually placed an order, and assumed that 93.08% of visitors who went through sequence C→D→E eventually placed an order, the checkout increase indicator 740 would indicate a checkout rate increase of 93.08%-89.27%=3.81%. The checkout rate increasing with respect to a sequence of three actions indicates that the last action of the three actions is a more rewarding action or a good action. For example, if the sequence C→D→X had only a 1% checkout rate increase, a business may consider replacing the webpage associated with X with the webpage associated with E. In an embodiment, each of the indicators 730 and 740 is illustrated by a rectangle or line segment, where a height of the rectangle or a thickness the line segment is proportional to a value of the corresponding rate increase.

In an embodiment, when a user moves a cursor of a pointing device over a given circle, the corresponding checkout rate and the fallout rate become visible, and invisible when the cursor is moved off the given circle. In an embodiment, the rates become visible when the user selects the given circle and invisible when the user de-selects the given circle. In an embodiment, when a user moves the cursor over a fallout rate increase indicator 730 or a checkout rate increase indicator 740, the corresponding increase amount becomes visible, and invisible when the cursor is moved off the indicator. In an embodiment, the increase amount become visible when the user selects the corresponding indicator and invisible when the user de-selects the corresponding indicator.

Each circle may be labelled to identify the corresponding item. For example, in FIG. 7, since the first circle represents a visiting to a webpage for booking a hotel reservation, it is labelled as "Book a stay".

The visualization screen 700 may further include information about the sequence, such as the number of entry visitors 750 that interacted with a first item of the sequence, a total number of orders 760 ultimately placed as a result of following the sequence, and an order rate 770. The order rate 770 may be generated by dividing the total number of orders 760 by the number of entry visitors 750.

Having described implementations of the present disclosure, an exemplary operating environment in which embodiments of the present invention may be implemented is described below to provide a general context for various aspects of the present disclosure. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 614, one or more presentation components 816, input/output (I/O) ports 618, input/output components 820, and illustrative power supply 822. Bus 610 represents what may be one or more busses (such as an address bus, data bus, or combination thereof). For example, one may consider a presentation component such as a display device to be an I/O component. The diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. For example, the sequences, the interaction data, and the pathing report 140 may be stored in the memory 812 when the server 130 is implemented by computing device 800. The computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as, stereoscopic camera systems, infrared camera systems, RGB camera systems, and combinations of these for gesture detection and recognition.

As discussed above, at least one embodiment of the disclosure provides a method for identifying customer journey sequences by converting interaction data into sequences indicating an order of interactions and whether the sequences resulted in a goal, recursively determining relevant sub-sequences (e.g., length N and N+1 sub-sequences) from the sequences, and presenting visualization including one or more of the sub-sequences.

In an embodiment, the interactions are webpages and the sequences indicate an order of the webpages visited unique visitors or sessions. In an embodiment, the interaction data is generated by extracting the interaction data for a given visitor from a columnar database and converting the extracted data into a sequence. In an embodiment, the interaction data is generated by determining tables of a columnar database based on a user query and orders of the interactions from the tables, where each of sequences corresponds to one of the orders. In an embodiment, the interaction data is generated by determining an order of interactions associated with a given visitor or session from the interaction data, generating one of the sequences from the ordered interactions except a last interaction of the order to indicate the one sequence resulted in the goal when the last interaction is a certain interaction (e.g., visiting a checkout page or an order page), and generating the one sequence from the ordered interactions to indicate the one sequence did not result in the goal when the last interaction is not the certain interaction. In an embodiment, the probability for a given sub-sequence is determined by dividing a count indicating how often the sub-sequence appears in the sequences by a count indicating how often the sub-sequence resulted in the goal. In an embodiment, at least one of the length N+1 sub-sequences do not immediately follow a corresponding one of the length N sub-sequences.

In an embodiment, the visualization includes a sub-sequence having a probability above an upper threshold as a customer journey sequence that is likely to achieve the goal and/or a sub-sequence with a probability below a lower threshold as a customer journey sequence that is likely to fail to achieve the goal. In an embodiment, the visualization for a given sub-sequence includes a circle for each item of the sub-sequence having a size in proportion to a number of visits to the item. In an embodiment, the circle includes a first arc having a length proportional to a checkout rate and a second arc having a length proportional to a fallout rate. In an embodiment, the visualization includes an indicator located between two of the circles that represents an increase in the checkout rate or an increase in the fallout rate.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computer-implemented method for identifying high value customer journey sequences, the method comprising:
    converting, by a processor, interaction data determined from a plurality of users interacting with webpages of a website into a plurality of sequences, each sequence indicating an order of visits in time of one of the users to a subset of the webpages and whether the corresponding sequence resulted in a goal;
    determining, by the processor, the visits to each of the webpages that are most frequent in the sequences as length N=1 sub-sequences;
    i) determining, by the processor, most frequent length N+1 sub-sequences that start with the length N sub-sequences from among the sequences;
    ii) incrementing, by the processor, N and resuming to step i) when at least one length N+1 sub-sequence is determined;
    for each sub-sequence determined, determining, by the processor, a first count indicating how often the corresponding sub-sequence appears in the sequences, a second count indicating how often the sub-sequence resulted in the goal, and a probability based on the first and second counts; and
    a graphical user interface presenting the sub-sequences with the probability above an upper threshold as customer journey sequences that achieve the goal.

2. The computer-implemented method of claim 1, wherein the most frequent N=1 sub-sequences and the most frequent length N+1 sub-sequences occur more than a pre-determined threshold.

3. The computer-implemented method of claim 1, wherein the converting comprises:
    extracting the interaction data for a given visitor from a columnar database; and
    converting the extracted data into one of the sequences for the given visitor.

4. The computer-implemented method of claim 1, wherein the converting comprises:
    determining a set of tables of a columnar database based on a user query; and
    determining orders of the visits from the set, where each of the sequences corresponds to one of the orders.

5. The computer-implemented method of claim 1, wherein the converting comprises:
    determining the order of the visits associated with a given visitor from the interaction data;
    setting a single sequence among the plurality of sequences from the visits of the determined order except a last visit among the visits of the determined order to indicate the single sequence resulted in the goal when the last visit is a certain visit; and
    setting the single sequence to indicate the single sequence did not result in the goal when the last visit is not the certain visit.

6. The computer-implemented method of claim 5, wherein the certain visit is visiting a checkout page or an order page.

7. The computer-implemented method of claim 1, wherein the determining of the probability comprises:
generating the probability by dividing the second count by the first count.

8. The computer-implemented method of claim 1, wherein at least one of the length N+1 sub-sequences does not immediately follow a corresponding one of the length N sub-sequences.

9. The computer-implemented method of claim 1, wherein the goal is conversion or churn.

10. The computer-implemented method of claim 1, further comprising the graphical user interface presenting the sub-sequences with the probability below a lower threshold as customer journey sequences that least effectively achieve the goal.

11. The computer-implemented method of claim 1, where the resuming occurs when N+1 is less than a maximum length specified by a user query.

12. The computer-implemented method of claim 1, wherein a count of the visits that are most frequent in the sequences and a count of the most frequent length N+1 sub-sequences do not exceed a branching factor.

13. A system for determining high value customer journey sequences, the system comprising:
a server,
wherein the server is configured to convert interaction data determined from a plurality of users interacting with webpages of a website into a plurality of sequences, each sequence indicating an order of visits in time of one of the users to a subset of the webpages and whether the corresponding sequence resulted in a goal,
wherein the server is configured to determine the visits to each of the webpages that are most frequent in the sequences as length N=1 sub-sequences, i) determine most frequent length N+1 sub-sequences that start with the length N sub-sequences from among the sequences, ii) increment N and resuming to step i) when at least one length N+1 sub-sequence is determined, and
wherein the server, for each sub-sequence determined, is configured to determine a first count indicating how often the corresponding sub-sequence appears in the sequences, a second count indicating how often the sub-sequence resulted in the goal, and a probability based on the first and second counts, and
wherein the server is configured to output information about the sub-sequences with the probability above an upper threshold as customer journey sequences that achieve the goal.

14. The system of claim 13, wherein the most frequent N=1 sub-sequences and the most frequent length N+1 sub-sequences occur more than a pre-determined threshold.

15. The system of claim 13, wherein the server converts the interaction data by extracting the interaction data for a given visitor from a columnar database and converting the extracted data into one of the sequences for the given visitor.

16. The system of claim 13, wherein the server converts the interaction data by determining a set of tables of a columnar database based on a user query, and determining orders of the visits from the set, where each of sequences corresponds to one of the orders.

17. The system of claim 13, wherein the server converts the interaction data by determining an order of the visits associated with a given visitor from the interaction data, generating one of the sequences from the ordered visits except a last visit of the order to indicate the one sequence resulted in the goal when the last visit is a certain visit, and generating the one sequence from the ordered visits to indicate the one sequence did not result in the goal when the last visit is not the certain visit.

18. The server of claim 17, wherein the certain visit is visiting a checkout page or an order page.

19. The server of claim 13, wherein the server determines the probability by dividing the second count by the first count.

* * * * *